Figure 1:
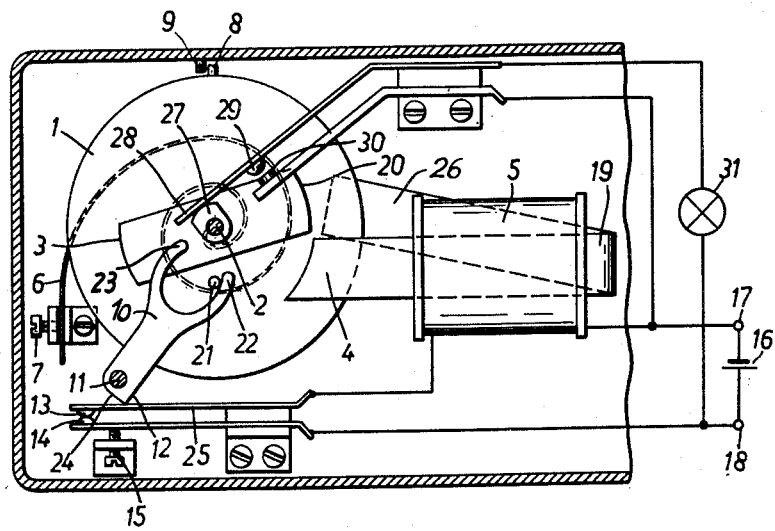

April 19, 1960  E. HURLER  2,933,629
OSCILLATING ELECTRIC MOTOR
Filed Sept. 19, 1955  7 Sheets-Sheet 1

Inventor:
Eberhard Hurler

April 19, 1960  E. HURLER  2,933,629
OSCILLATING ELECTRIC MOTOR
Filed Sept. 19, 1955                                7 Sheets-Sheet 2

Inventor:
Eberhard Hurler

April 19, 1960     E. HURLER     2,933,629
OSCILLATING ELECTRIC MOTOR

Filed Sept. 19, 1955     7 Sheets-Sheet 3

Inventor:

April 19, 1960 E. HURLER 2,933,629
OSCILLATING ELECTRIC MOTOR
Filed Sept. 19, 1955 7 Sheets-Sheet 4

Inventor:
Eberhard Hurler

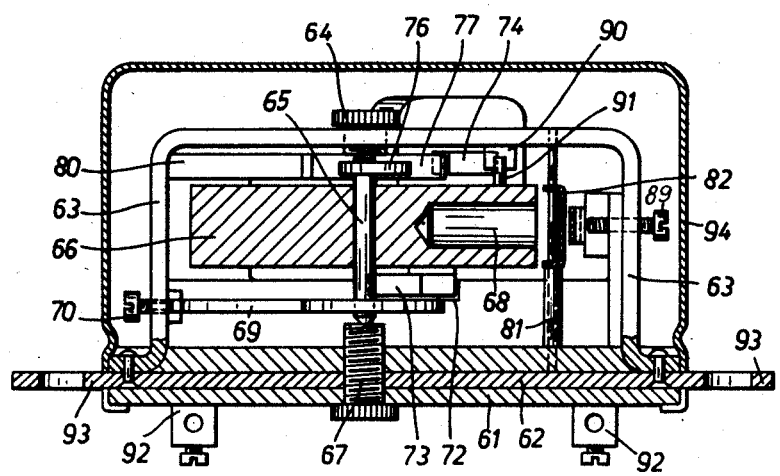
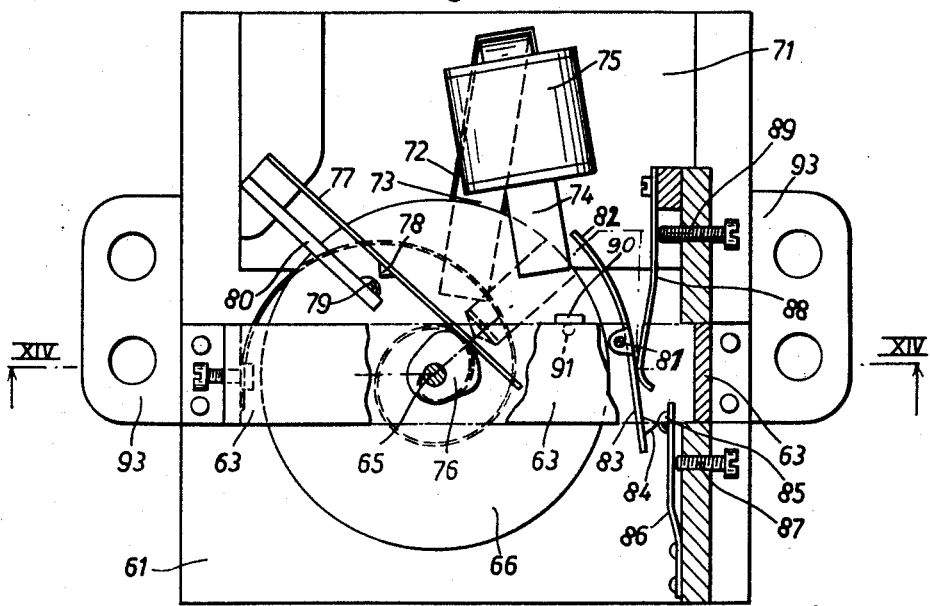

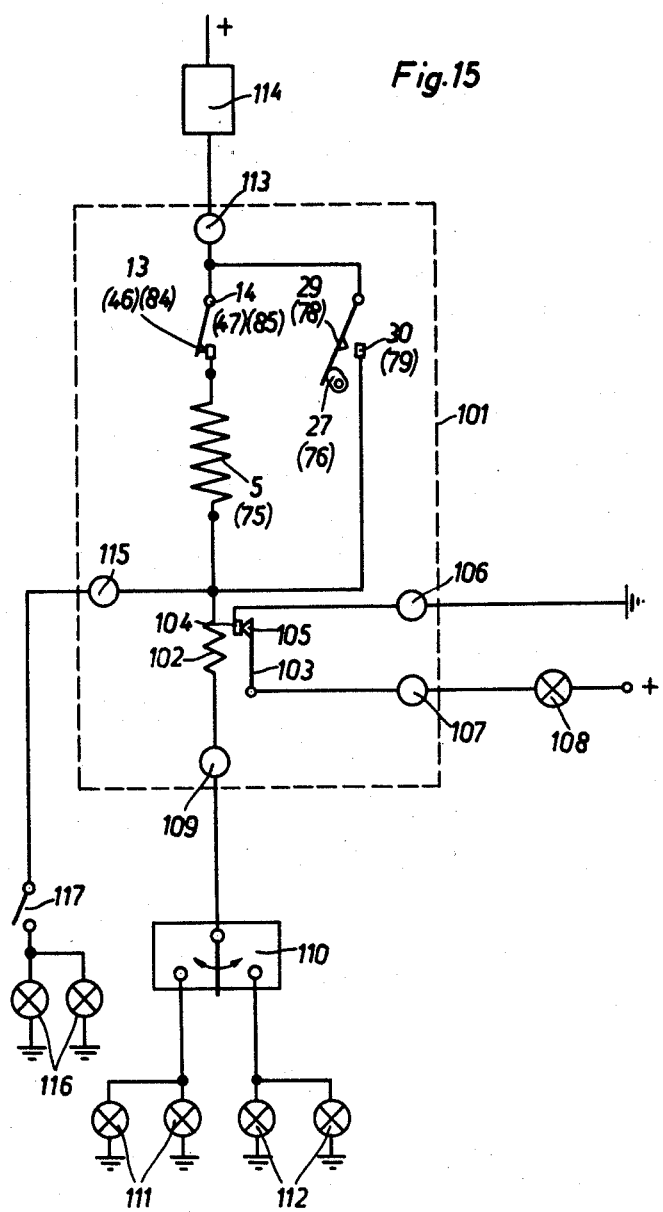

April 19, 1960  E. HURLER  2,933,629
OSCILLATING ELECTRIC MOTOR
Filed Sept. 19, 1955  7 Sheets-Sheet 7

Inventor:
Eberhard Hurler

United States Patent Office 2,933,629
Patented Apr. 19, 1960

2,933,629

OSCILLATING ELECTRIC MOTOR

Eberhard Hurler, Munich, Germany, assignor to Filigranbau Stefan Keller, Kommanditgesellschaft, Munich, Germany Application September 19, 1955, Serial No. 535,230

Claims priority, application Germany August 22, 1955

6 Claims. (Cl. 310—39)

My present invention relates to improvements in rotary-pendulum systems which may be used for controlling switching operations, for example for periodically switching on and off light sources or similar current-consuming means.

It is known to obtain time constancy of switching operations by means operating with rotary pendulums. The latter, designated in horology as balances, comprise a flywheel mass and a hair spring or balance spring. Said mass is driven either indirectly, for example in similar manner as in clocks and watches, or directly through the action of an electromagnet on an iron armature mounted on said mass. On rotation of said mass together with said armature, contacts may be actuated in known manner through cams, stops and the like, which contacts cause said electromagnet to be periodically cut in and out. The pendulum, thus being subjected to periodical vibrations, may comprise further contact means which, for example, may periodically cut in and out signal lamps or the like.

The difficulty inherent in all of such known rotary-pendulum systems resides in the fact that the operation of the contacts is not positive, especially not in the case of comparatively high currents, and that the duration of contact operation depends in a high degree on the operative voltage used.

A main object of my present invention is to provide a rotary-pendulum system in which the operation of the system is substantially independent of the voltage applied, and by which is obtained a continuous impulse action through a certain angular range in order to constantly attain an amplitude of uniform size.

To the rotary-pendulum system is imparted, for example through an electromagnet in cooperation with a soft-iron armature disposed on the pendulum, a rotary pulse which is substantially greater than required to obtain the desired angular deflection of the pendulum. Such oversize pulse, however, is compensated by an opposing pulse of corresponding size and thereby reduced again to such size that the difference of the pulses equals the pulse required for turning the pendulum into the desired angular position.

According to the invention, the same electromagnet which produces the acceleration of the rotary pendulum, for example by acting on the iron armature thereof and thus imparting a driving pulse thereto, serves as source for the magnetic field which may be used to cause the opposing pulse in the form of eddy currents.

It is very important for the sake of a satisfactory operation of the pendulum system with a view of attaining the object aimed at, that the switch contacts for throwing the driving electromagnet in and out of operation are actuated in one or the other direction of rotation at times when the pendulum occupies different angular positions. During the movement of the pendulum in one direction of rotation, after application of the driving pulse, the contact shall be opened at a certain angular position of the pendulum and, in the reverse direction of rotation of the pendulum beyond said angular position, shall remain open in order to be closed only a short time before attaining the dead center or the stop defining the inoperative position, in order that the driving and also the braking pulses may act correspondingly.

In place of an iron armature disposed on the flywheel mass, through which the rotary pendulum receives its driving pulses from the electromagnet, said mass shall carry a magnetic field in accordance with a further feature of the present invention, which field preferably is produced by a permanent magnet mounted in or on said mass in such manner that in the inoperative position of the pendulum, in which also the movement of the latter is reversed, it is situated in the active range of the magnet imparting the rotary pulse. The dead center of the pendulum then is so positioned that there is sufficient space between the two like poles in order that the pendulum when triggered is deflected into the proper direction. Particularly favorable conditions are obtained when the north pole of the permanent magnet in the pendulum is situated in the range of the electromagnet which transmits the driving pulse, and when the south pole of the permanent magnet is situated in the range of the south pole of the electromagnet. To such end, the permanent magnet also may be disposed at right angles to the flywheel of the pendulum or, if desired, at an angle in the flywheel mass.

The pendulum is held in its inoperative position not only by the action of the prestressed restoring spring but also by its permanent magnet which acts on the pole shoes of the electromagnet or respectively on the rear end of the armature of the tilting-lever interrupter, whereby even substantial shocks and vibrations cannot cause a deflection of the pendulum from its inoperative position.

Figure 3:
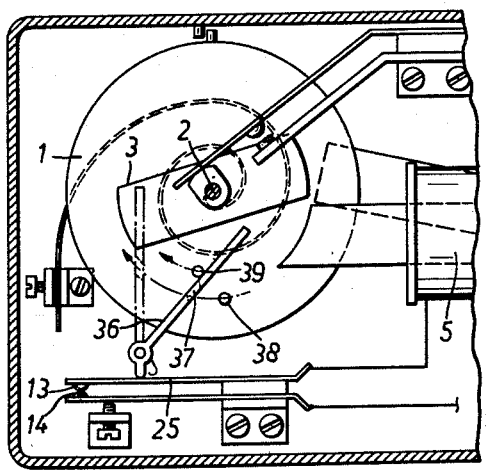
Figure 4:
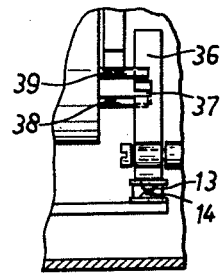
Figure 2:
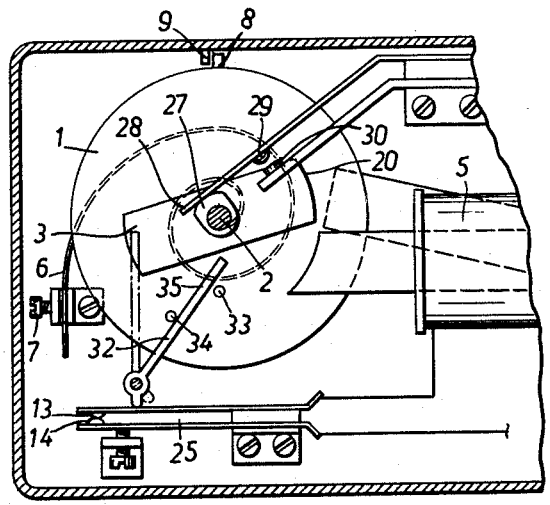
Figure 5:
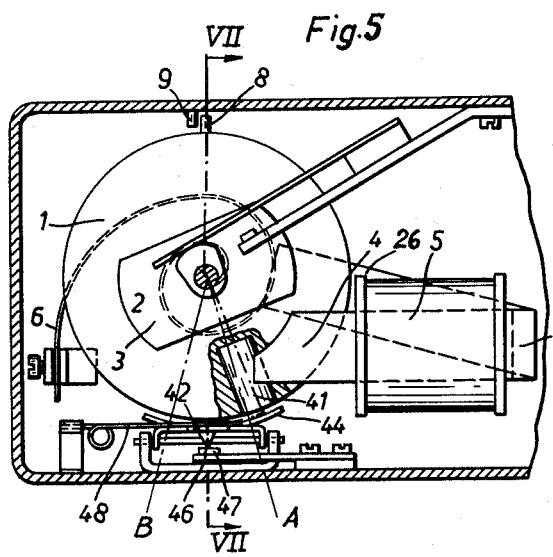
Figure 7:
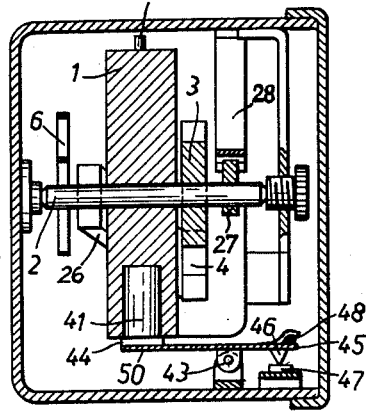
Figure 6:
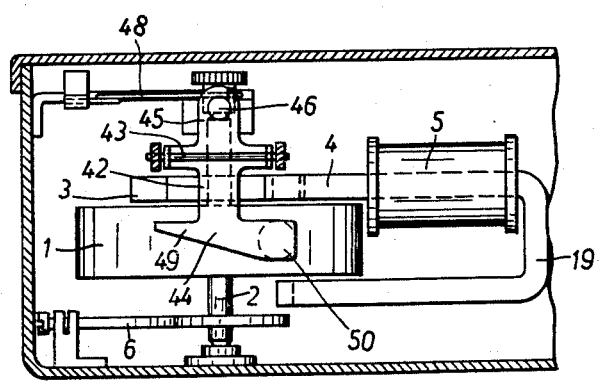
Figure 8:
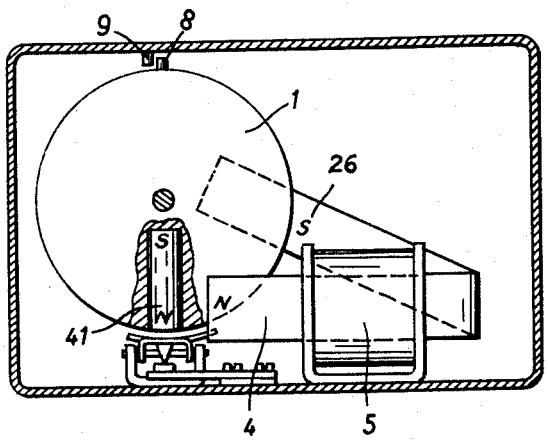
Figure 9:
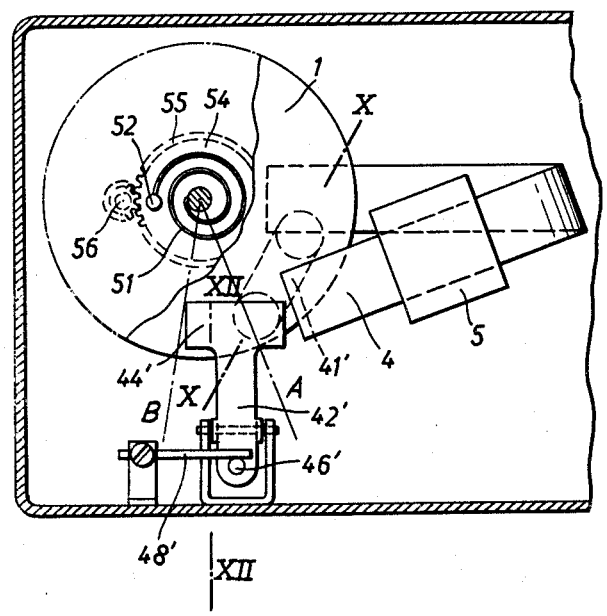
Figure 12:
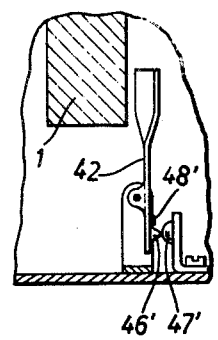
Figure 11:
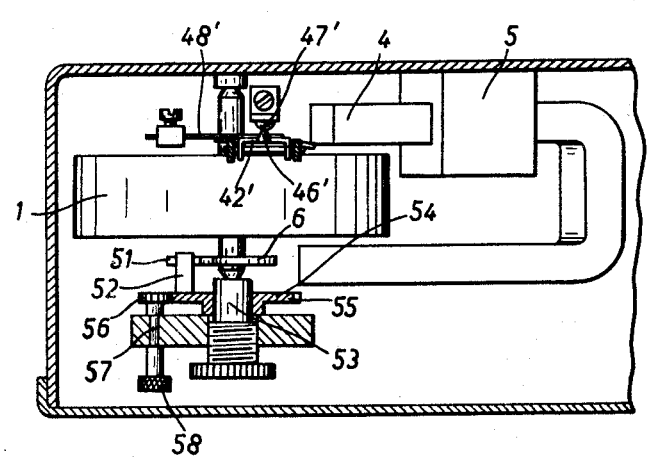
Figure 10:
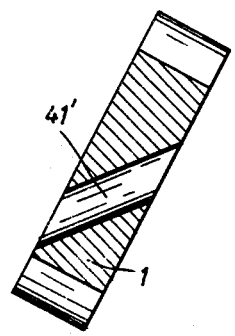
Figure 16:
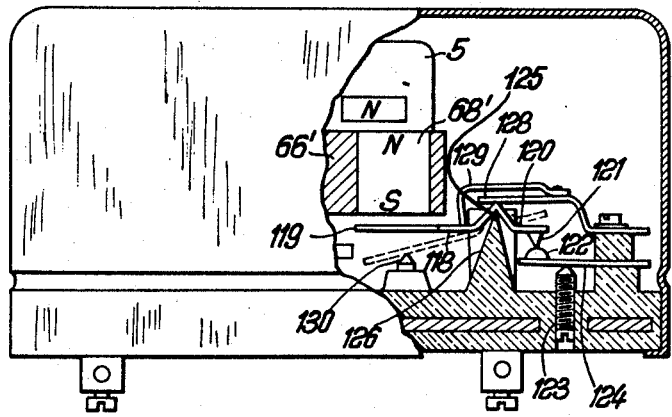
Figure 17:
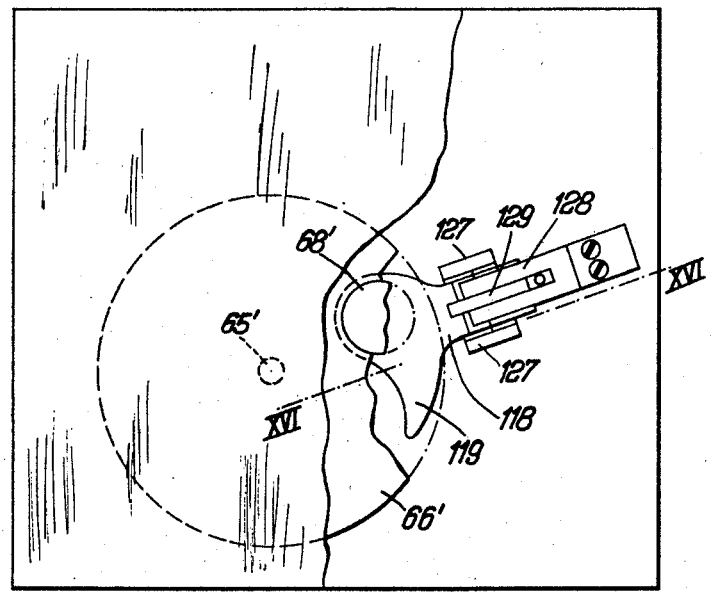

In the drawings:

Fig. 1 is a schematic plan view, partly in section, of a rotary-pendulum system, for example for the control of blinker or flashlight signaling installations, Fig. 2 is a fragmentary schematic view, partly in section, similar to Fig. 1 but which depicts another construction of the mechanical means for triggering the driving pulses, Figs. 3 and 4 are respectively a plan view and an end elevational view, which illustrate a modification of the contact means of Fig. 2, Fig. 5 is a schematical plan view, partly in section, of a complete rotary-pendulum system comprising a soft-iron armature and an electromagnet for the driving pulse, and an interrupter actuated by a pendulum magnet for interrupting the electromagnet circuit, Fig. 6 is a side elevational view, partly in section, of the system shown in Fig. 5, Fig. 7 is a sectional view taken on the line VII—VII through a portion of the system of Fig. 5, Fig. 8 is a fragmentary plan view, partly in section, which schematically shows another modified form of the pendulum, comprising a permanent magnet set into the pendulum's flywheel mass and serving at the same time for driving the pendulum and controlling the circuit of the driving magnet, Fig. 9 is a fragmentary plan view, partly in section, of a further modified form of the invention, in which the pendulum magnet occupies a particular position in the pendulum, which also necessitates a corresponding position of the interrupter for the electromagnet circuit, and in which the pendulum comprises an equipment for controlling its frequency, Fig. 10 is a sectional view taken on the line X—X of Fig. 9 through the pendulum along the axis thereof, from which may be seen the position of the permanent magnet in the flywheel mass of the pendulum, Fig. 11 is a side view of the arrangement shown in Fig. 9, in which for the sake of clarity some details partly are shown in section and removed, Fig. 12 is a second side view, partly in section, of the rotary pendulum, showing the arrangement and position of the interrupter, Fig. 13 is plan view, partly in section, of a complete appliance after removal of the protective hood, Fig. 14 is a sectional view taken on the line XIV—XIV of Fig. 13, Fig. 15 is a wiring diagram that depicts a switching arrangement of a blinker-light installation, for example for automobiles, using an appliance incorporating the rotary-pendulum system disclosed, Fig. 16 is an elevational view partially in section of an appliance comprising the pendulum disclosed and a further modification of the interrupter for the electromagnet, the section ring beam on the line XVI—XVI of Fig. 17, and Fig. 17 is a plan view of the appliance shown in Fig. 16, in which a portion of the protective casing is cut off.

The rotary pendulum, as shown in Fig. 1, comprises a flywheel mass or disk 1 which is secured to a rotatable axle 2 which is held by two pivots or spindle bearings. The soft-iron armature 3 is mounted either on axle 2 or on disk 1 and is circularly curved on its narrow side. The pole shoe 4 of electromagnet 5 is situated on the same side of disk 1 as the armature 3, and its endface is so formed that only a very narrow air gap is present between armature and pole shoe when the armature is in a corresponding position.

To axle 2 there is secured the interior end of a spiral hair spring 6 of which the other or exterior end is attached to a fixed point which, for example, may be the casing or the bedplate of the appliance carrying the rotary-pendulum system. Spring 6 by virtue of a corresponding pretension, maintains said pendulum in its inoperative position in which the stud 8 abuts against a stop 9 disposed on the bedplate.

A forked lever 10 pivoted to and on the axle pin 11 serves for controlling the electromagnet 5. Through its eccentric nose 12, said lever in an inclined position depresses a contact spring 25 which carries a contact piece 13 whereby the latter is engaged to another contact piece 14 to close the circuit which includes electromagnet 5. An adjusting screw 15 allows of regulating the moment of contact engagement with respect to the angular position of the rotary pendulum.

The source of current 16 connected to the terminals 17 and 18 causes the flow of a current through magnet coil 5 when contact 13, 14 is closed, thereby producing a magnetic field which acts across coil core 19 and pole shoe 4. End 20 of armature 3 thereby is attracted and the pendulum rotated in the direction of the arrow. A contact stud 21 fixed to disk 1 and which then is positioned in the vicinity of arm 22 of forked lever 10, thus abuts against arm 23 of the switch fork after the pendulum has moved through a certain angle, and then takes along the lever 10, swinging the latter into the vertical position. Thereby the eccentric nose 12 at the lower end of lever 10 also is angularly moved so that contact spring 25 with contact piece 13, which spring is pressed against the lower endface 24 of lever 10, opens contact 13, 14 whereby electromagnet 5 is again deenergized.

Coil core 19 comprises, aside of pole shoe 4, another pole shoe 26 which is bent so that its free end is positioned on that side of disk 1 which is opposite the shoe 4. Thereby eddy currents are induced in disk 1 which act on to the rotary pendulum in a retarding manner. The shoe 26 of coil core 19 is twisted or slightly spread with respect to the pole shoe 4 so that between the two pole shoes 4—126 a magnetic field is set up which penetrates disk 1 obliquely. Thereby the difference between the driving and the retarding pulses is made substantially independent of the size of the voltage applied to the electromagnet.

As mentioned above, it is important for certain applications of the rotary-pendulum system disclosed by the invention that the amplitude of the pendulum remains constant even when the voltage of current source 16 applied to the terminals 17, 18 is fluctuating, since it is not only important that the period of the pendulum is constant. The ratio, for example, of the bright times and dark times of an incandescent lamp switched on and off by the rotary-pendulum system, however, is determined by the size of the amplitude of said system. It has been found that with the arrangement and construction of the rotary pendulum disclosed by the invention, voltage fluctuations of 50% and even more may arise without causing a change in the chosen switch timing conditions. This may be attributed to the fact that when the voltage is higher than the operating voltage, while the pulses imparted to the pendulum grow in intensity at the same time also the braking effect which acts as opposite or "negative" pulse is increased, so that the sum of the pulses acting on the rotary pendulum always has a certain value which by virtue of the special construction of the electromagnet and its poles also may be constant.

When the rotary pendulum continues to rotate in direction of the arrow, after electromagnet 5 has been cut out by opening the contacts 13, 14, stud 21 moves out of the fork of forked lever 10. Contact spring 25 abuts against the lower endface 24 of lever 10 and holds the latter in vertical position.

To axle 2 is secured a cam 27 against which abuts a contact spring 28 through one end, said spring carrying a contact piece 29 which coacts with a contact piece 30 disposed on a fixed arm. On rotation of the pendulum, cam 27 after a certain angle of rotation releases spring 28 so that the two contact pieces 29, 30 are superposed and close the circuit in which the lamp 31 is included. On further rotation of the pendulum, hairspring 6 is tensioned more and more until the forces acting on the pendulum are balanced and the latter is in its other, unstable dead center.

The tension of spring 6 then causes a return movement of the rotary pendulum in a direction opposite to that shown by the arrow, as no further pulses and forces act thereon. Cam 27 thus again abuts against spring 28 and opens the contact 29, 30 and, therefore, the lamp circuit.

On further return rotation, stud 21 is again engaged in the fork of lever 10 and tilts same when it contacts arm 22 and takes same along, so that cam 12 acts on to spring 25 whereby contact 13, 14 is closed again. This occurs at a moment when the rotary pendulum has not yet reached its inoperative position. By cutting in electromagnet 5, the magnetic field dampens the return rotation of the pendulum and at the same time exerts a fresh driving pulse on the pendulum so that the cycle is repeated. The amount of damping the returning pendulum may be such, by correspondingly adjusting the switching in of electromagnet 5, that stud 8 of the pendulum does not contact stop 9 at all or only lightly.

From the above description it follows that by using a forked switching lever, the driving magnet may be cut in on the return movement of the pendulum at another moment or in another angular position of the rotary pendulum that it can be cut out on the forward movement of the pendulum.

In Figs. 2 to 4 are shown two further forms of construction of the switching lever, by means of which there is attained the same result as with the forked switching lever shown in Fig. 1.

In the embodiment shown in Fig. 2, the forked lever 10 with its two fork ends 22 and 23 has been replaced by a lever 32. Two stud pins 33 and 34 which are disposed on flydisk 1 at a certain angular distance from each other, in cooperation with the free end 35 of switch lever 32 accomplish the same result as the two fork arms 22, 23 and stud 21 in the embodiment shown in Fig. 1.

Figs. 3 and 4 show a modification of the embodiment illustrated in Fig. 2. A lever 36 is provided with an aperture 37 directed towards disk 1, through which may pass a stud 38 at a definite position of lever 36. In all of the other positions, stud 38 is situated on one or the other side of lever 36 and, when abutting against same, takes same along and thus triggers a switching operation. A second stud 39 serves for moving the lever 36 into such a position that the contact makers 13, 14 are closed. The first stud 38 passes freely through aperture 37 on the return rotation of the pendulum. Its task, however, is to take along lever 36 on the forward rotation and thereby to open the contact makers 13, 14.

The two modifications shown in Figs. 1 to 3, of course, deal only with a few possibilities for the application. Besides the embodiments shown and described, a great number of other embodiments yet are feasible which employ the idea underlying my present invention. For example, the forked lever 10 shown in Fig. 1 may be so constructed that its clockwise rotation is limited so as to terminate the further movement of the rotary pendulum by the abutment of stud 21 against lever arm 22. In such a case, stud 21 and forked arm 22 would replace stud 8 and stop 9 in that they, additionally, take over the functions thereof.

A further possibility is to initiate the switching operations through a cam disposed on axle 2 and which is freely rotatable within a certain angular range. When the pendulum rotates, said cam in one direction of rotation initiates the switching operation in one position, and in the other direction of rotation in the other position, said two positions being at an angle relatively to each other.

The rotary-pendulum arrangement shown in Figs. 5 to 7 substantially corresponds to that shown in Fig. 1. In place of the interrupter actuated through a mechanical switching lever 10, this embodiment comprises a magnetically actuable interrupter which is more reliable in operation and has some other advantages.

In disk 1 of the rotary pendulum is disposed a permanent magnet of which the northpole is situated on the circumference of the pendulum, and of which the southpole is directed towards the center of the pendulum.

To the periphery of disk 1 is pivoted on a pin 43 a two-arm tilting lever 42 of which one end, 44, is formed as armature, and of which the other end 45 carries a contact maker 46 which coacts with a second contact maker 47 to open and close the circuit of electromagnet 5.

A spring 48 engages lever arm 45 and urges armature 44 away from the periphery of disk 1. The end 49 of armature 44 is cut at a bias so that the force of attraction of permanent magnet 41 does not yet attract armature 44 when the magnet passes by the latter which is thrust away by spring 48, in particular when passing by the biased end 49 of the armature, but such attraction only takes effect when the northpole of magnet 41 is facing the end 50 of armature 44, namely when said northpole is situated substantially in the position shown by the line A. Armature 44 thereby only is attracted in the position shown in Fig. 1 or, respectively, shortly before reaching said position, whereby the contact makers 46, 47 are closed.

When closing contact makers 46, 47 electromagnet 5 is energized so that a driving pulse acts on the pendulum through the pole shoe 4 and armature 3. The rotary pendulum thus rotates from the position shown to the right, magnet 41 passing armature 44 of interrupter 42. Since armature 44 now is positioned only a very short distance from the periphery of the rotary pendulum, the biased end 49 of armature 44 suffices to be attracted yet by magnet 41 and, thereby, to urge the two contact makers 46, 47 against each other, and this for such length of time until magnet 41 has passed line B. Thereafter, the pressure of spring 48 alone is effective, which again opens the interrupter and thus breaks the circuit. When the pendulum rotates in the opposite direction, armature 44 of interrupter 42 is situated in the tilted or remote position from the periphery of pendulum 1 so that the pendulum magnet is capable of attracting armature 44 only after it has reached a position corresponding to line A and is substantially facing the end 50 of armature 44.

In the arrangement shown in Fig. 8, the driving impulse of the rotary pendulum no longer acts through the pole shoe 4 and armature 3 of pendulum 1 but through coaction of the two magnetic fields, namely that which at certain times is produced by electromagnet 5 and that of permanent magnet 41 of which the northpole in the inoperative position is situated in the immediate vicinity of the northpole on pole shoe 4 of electromagnet 5.

It has been found to be particularly satisfactory to dispose permanent magnet 41 in an oblique position, in pendulum 1, and to dispose electromagnet 5 in such a manner that the northpole of magnet 41 is positioned in the vicinity of the northpole of electromagnet 5, and that the southpole of magnet 41 is positioned in the vicinity of the southpole of electromagnet 5, whereby there is obtained a strong rotary impulse. Such an arrangement is shown in Figs. 9 and 10.

When permanent magnet 41' is arranged in an inclined position, armature 44' of interrupter 42' is disposed above the rotary pendulum. This includes an angle with the surface of the pendulum, whereby it is again attained that the contact makers 46', 47' only then are closed when the northpole of magnet 41' has passed line A, and only then are opened when magnet 41' has passed position B on the return movement of pendulum 1. In order to make the frequency of the rotary pendulum variable, the end 51 of spring 6, as shown in Fig. 11, is secured to a pin 52 which is disposed on a disk 54 rotatable about axle bearing 53. Disk 54 is provided with circumferential teeth 55 which coact with a pinion 56 of which the shaft 57 may be rotated by means of a knob 58. Thereby the end 51 of spring 6 may be set onto any desired point and, thereby, the tension of spring 6 be changed as desired.

Figs. 13 and 14 show a complete appliance for periodical switching operations. In a bedplate 61 is embedded a metal plate 62 which has the task of ensuring a good stability. Plate 62 furthermore forms a portion of the frame in which is mounted the rotary pendulum.

To plate 62 is screwed or riveted a yoke 63 which carries the upper bearing 64 for the axle 65 of rotary pendulum 66. The lower bearing 67 is inserted in the bedplate 61, 62.

In the rotary pendulum's flywheel 66 and in radial position is disposed the permanent magnet 68 of which the northpole is situated on the periphery of flywheel 66.

The spiral spring 69 is secured at one end to axle 65 and at the other end to yoke 63 by means of a clamping screw 70 to hold the rotary pendulum under a certain pretension in its inoperative position, to urge same against the mechanical stop.

In the raised portion 71 of bedplate 61 is provided a recess into which is inserted that leg with pole shoe 73 of magnet 75 which is positioned below pendulum 66, said leg being secured in said recess. The leg situated above pendulum 66, which carries pole shoe 74, also carries the electromagnet 75. The pole shoes 73 and 74 are of such length and disposition that the upper pole shoe 74 with its outermost end is situated above the northpole of permanent magnet 68, and that the pole shoe 73 with its outermost end is situated below the southpole of permanent magnet 68.

Fixedly mounted on axle 65 of pendulum 66 is a cam 76 against which abuts spring 77 which is equipped with a contact maker 78, the latter facing a second contact maker 79 fixed to a stationary arm 80. Upon rotation of axle 65, spring 77 is periodically moved by cam 76, whereby contact 78, 79 is opened and closed. The two contact makers 78, 79 are included in the circuit to be switched.

Between bedplate 61 and bridge 63 is disposed an axle 81 which carries a tilting-lever interrupter 82, said axle 81 being disposed laterally of pendulum 66 and in parallel relation with axle 65 thereof. On end portion 83 of lever 82 is provided a contact maker 84 which coacts with another contact maker 85 fixed to a spring 86 which is adjustable by means of a set screw 87 to render adjustable the moments of opening and closing the contact 84, 85. On to the end 83 of tilting lever 82 acts a spring 88 of which the tension is adjustable by means of a set screw 89 and which furthermore serves for the current supply to contact maker 84.

For limiting the pendulum deflection to one side there is provided a stop 90 against which abuts the pendulum in its inoperative position through a pin 91.

Underneath bedplate 61 are disposed a plurality of terminals 92 which are connected to the contact pieces 78, 79, 85 and so on in order to connect the appliance correspondingly. For the purpose of simply mounting the appliance, two lugs 93 of plate 62 project beyond bedplate 61 through which the appliance may be suspended. The appliance is protected by a hood 94.

Fig. 15 shows a switching arrangement for the appliance comprising the rotary-pendulum system according to my present invention, in the circuits for the direction indicators and headlamps of automobiles. The parts and portions schematically shown within the limiting rectangle 101 pertain to the appliance disclosed in the present invention. Besides the rotary-pendulum system comprising the driving magnets 5 and 75 respectively, the interrupter contacts 13, 14 and 46, 47 and 84, 85 respectively of cam 27 and 76 respectively, and the contacts 29, 30 and 78, 79 actuated thereby, there is provided a coil 102 which acts on an armature 103 through which the contact pieces 104, 105 are opened and closed, the latter abutting against the terminals 106, 107. To the latter may be connected a control lamp 108 which lights up when the lamps of the direction indicators light up which are mounted on the outside of the automobile. To terminal 109 is connected the direction, selection and cut-in switch 110 to which are connected on one side the left-hand direction-indicating lamps 111 and, on the other side, the right-hand direction-indicating lamps 112. Terminal 113 via ignition lock 114 is connected to the positive pole of the battery. A contact clamp 115 permits the connection of the distance projection lamps 116 via a switch 117 in order to enable the driver to use the lamps 116 for monitoring purposes when driving at night, so that the light of said lamps is periodically cut in and out.

The rotary-pendulum system shown in Figs. 16 and 17 in its composition fundamentally corresponds to that shown in Figs. 13 and 14, with the sole difference that the interrupter arrangement for periodically cutting in and out the electromagnet 5 is of different construction.

The permanent magnet 68' is disposed vertically and in parallel relation with the pendulum axle 65', in flywheel 66'. The tilting lever 118 on one arm carries a plate 119 which acts as armature, and on the opposite arm 120 it carries the contact piece 121 which coacts with the contact piece 122 of spring 124 which is adjustable by means of a screw 123. The tilting lever 118 is kinked at 125 to be mounted on the knife-edge 126 between the jaws 127. The tilting lever 118 is held in place by means of the spring 128 which at the same time serves for supplying current to contact piece 121, in that it is supported on the apex of kink 125 of bell crank 118. In order to lift armature plate 119 of tilting lever 118 away from flywheel 66', a second spring 129 which is secured to spring 128 and projects beyond the latter's edge, rests on lever 118, namely on that arm thereof which carries armature plate 119. A stop 130 which may be adjustable serves for limiting the deflection of lever 118. This last embodiment is distinguished, above all, by its simplicity and an easy and rapid assembly.

The appliance may be used with advantage for blinker-light, monitoring or other signal plants and the like, in particular however for direction indicators and light-signal dispenser on vehicles of all kinds.

What I claim as new and desire to secure by Letters Patent, is:

1. In a pendulum system, for use in connection with periodic energization and de-energization of a switching system, in combination, a flywheel operable to perform pendulous oscillations, means operable to urge said flywheel to turn in one direction, said flywheel including adjacent its outer surface a permanent magnet, an electric circuit fed from an electric source comprising an electric magnet energizable from said source when said circuit is closed to impel said flywheel in the opposite direction, a switch forming part of said circuit to make and break the circuit including a movable contact element having a magnetic member including a larger and a smaller magnetic surface disposed adjacent each other in direction of the path of said permanent magnet and positioned adjacent said path, whereby said permanent magnet will influence said contact element upon passing in such a manner that it will move said contact element to open said circuit a certain first distance prior to reaching of its dead center during oscillating movement in said opposite direction and, respectively, will move said contact element to close said circuit at a certain second distance before reaching its rest position during oscillating movement in said one direction.

2. In a pendulum system as claimed in claim 1, said movable contact element including a tiltable two-armed lever and means for tiltably supporting it, said lever carrying said magnetic surfaces at one arm, and an electric contact point mounted on the other arm of said lever forming part of said switch.

3. In a pendulum system as claimed in claim 1, said electromagnet comprising a two-armed armature, each arm disposed at a different side of said flywheel and defining a plane which is at an angle to the plane that coincides with the axis of rotation of the flywheel, said permanent magnet being parallel to said axis, whereby the lines of magnetic force between the arms of said armature will intercept said permanent magnet at an angle during oscillation of said flywheel.

4. In a pendulum system as claimed in claim 1, said electromagnet having a two-armed armature extending adjacent opposite side of said flywheel; said permanent magnet being so positioned in said flywheel that in the rest position of said flywheel said permanent magnet will be traversed by the field of said electromagnet, the arm of said armature carrying the north pole been disposed on that side of the flywheel on which there is located the north pole of said permanent magnet.

5. In a pendulum system as claimed in claim 1, said permanent magnet being positioned in said flywheel at an angle to the axis of rotation of the flywheel.

6. In a pendulum system as claimed in claim 1, together with, a support and bearing for said flywheel and a casing surmounting said support enclosing said flywheel, said electromagnet, said switch and said switching system.

References Cited in the file of this patent

UNITED STATES PATENTS

| 1,942,024 | Frey | Jan. 2, 1934 |
| 1,970,412 | Bates | Aug. 14, 1934 |
| 2,245,596 | Lindberg | June 17, 1941 |
| 2,505,225 | Akroyd | Apr. 25, 1950 |

FOREIGN PATENTS

| 208,523 | Switzerland | Nov. 16, 1939 |